United States Patent
Zhao et al.

(10) Patent No.: US 6,720,088 B2
(45) Date of Patent: *Apr. 13, 2004

(54) MATERIALS FOR PROTECTION OF SUBSTRATES AT HIGH TEMPERATURE, ARTICLES MADE THEREFROM, AND METHOD FOR PROTECTING SUBSTRATES

(75) Inventors: Ji-Cheng Zhao, Latham, NY (US); Melvin Robert Jackson, Niskayuna, NY (US); Richard John Grylls, Albuquerque, NM (US); Ramgopal Darolia, Westchester, OH (US)

(73) Assignee: General Electric Company, Niskayuna, NY (US)

( * ) Notice: Subject to any disclaimer, the term of this patent is extended or adjusted under 35 U.S.C. 154(b) by 50 days.

This patent is subject to a terminal disclaimer.

(21) Appl. No.: 09/683,700

(22) Filed: Feb. 5, 2002

(65) Prior Publication Data

US 2003/0148141 A1 Aug. 7, 2003

(51) Int. Cl.$^7$ .......................... B32B 15/00; B32B 31/00; C22C 19/00

(52) U.S. Cl. ................ 428/615; 148/516; 148/527; 148/408; 148/409; 148/410; 148/419; 148/425; 148/426; 148/428; 148/429; 148/430; 148/442; 416/241 R; 420/435; 420/437; 420/441; 420/442; 420/444; 420/445; 420/456; 420/460; 420/462; 420/580; 420/588; 428/621; 428/622; 428/627; 428/632; 428/660; 428/668; 428/670; 428/680; 428/686; 428/926; 428/937; 428/938; 428/941; 428/615

(58) Field of Search ................ 428/615, 621, 428/622, 627, 632, 660, 668, 670, 680, 686, 926, 937, 938, 941; 420/435, 437, 441, 442, 444, 445, 456, 460, 462, 580, 588; 148/516, 527, 408, 409, 410, 419, 425, 426, 428, 429, 430, 442; 416/241 R (56) References Cited

U.S. PATENT DOCUMENTS

| | | | |
|---|---|---|---|
| 4,061,495 A | 12/1977 | Selman et al. | 420/444 |
| 4,980,244 A | * 12/1990 | Jackson | 420/462 |
| 6,306,524 B1 | 10/2001 | Spitsberg et al. | 428/621 |
| 6,455,167 B1 | 9/2002 | Rigney et al. | 428/472.2 |

OTHER PUBLICATIONS

Application No. 09/520,038 (RD–26,971), Ji–Cheng Zhao et al., filed Mar. 7, 2000.
W.S. Walston, J.C.Schaeffer, & W.H. Murphy "A New Type of Microstructural Instability in Superalloys —SRZ, Superalloys" TMS, pp. 9–18 (1996), (no month given).
Application No. 09/681,821 (RD–26,970), Ji–Cheng Zhao et al., filed Jun. 11, 2000.

* cited by examiner

Primary Examiner—Robert R. Koehler
(74) Attorney, Agent, or Firm—Paul J. DiConza; Patrick K. Patnode (57) ABSTRACT

A group of alloys suitable for use in a high-temperature, oxidative environment, a protective coating system comprising a diffusion barrier that comprises an alloy selected from the group, an article comprising the diffusion barrier layer, and a method for protecting an article from a high-temperature oxidative environment comprising disposing the diffusion barrier layer onto a substrate are presented.

49 Claims, 2 Drawing Sheets

MATERIALS FOR PROTECTION OF SUBSTRATES AT HIGH TEMPERATURE, ARTICLES MADE THEREFROM, AND METHOD FOR PROTECTING SUBSTRATES

BACKGROUND OF INVENTION

This invention relates to high-temperature materials. More particularly, this invention relates to coatings to protect substrates in high-temperature, oxidative environments, such as, for example, gas turbine engines. This invention also relates to methods for protecting substrates in these environments.

In a gas turbine engine, compressed air is mixed with fuel in a combustor and ignited, generating a flow of hot combustion gases from the combustor to the turbine stages via a transition piece, also called a "duct." Upon entering the turbine stage portion of the engine, the hot gas is driven through one or more turbine stages that extract energy from the gas, producing output power. Each turbine stage includes a stator nozzle having vanes which direct the combustion gases against a corresponding row of turbine blades extending radially outwardly from a supporting rotor disk. The vanes and blades are subject to substantial heat load, and, because the efficiency of a gas turbine engine is proportional to gas temperature, the continuous demand for efficiency translates to a demand for airfoils that are capable of withstanding higher temperatures for longer service times.

Gas turbine components such as, for example, vanes, blades, combustors, and transition pieces, are usually made of superalloys and are often cooled by means of internal air-cooling chambers and the addition of coatings, including thermal barrier coatings (TBC's) and environmental coatings, to their external surfaces. The term "superalloy" is usually intended to embrace iron (Fe)-, cobalt (Co)-, or nickel (Ni)-based alloys, which include one or more other elements including such non-limiting examples as aluminum (Al), tungsten (W), molybdenum (Mo), rhenium (Re), tantalum (Ta), and titanium (Ti). TBC's comprise at least a layer of thermally insulating ceramic, often yttria-stabilized zirconia, and often include one or more layers of metal-based, oxidation-resistant materials ("environmental coatings") underlying the insulating ceramic for enhanced protection of the airfoil. Environmental coatings are also frequently used without a TBC ceramic topcoat.

Conventional coatings used on components exposed to the hot gases of combustion in gas turbine engines for both environmental protection and as bond coats in TBC systems include both diffusion aluminides and MCrAl(X) coatings. The term "aluminides" encompasses a wide variety of coatings comprising aluminide compounds of various chemical compositions. For example, nickel aluminide, NiAl, is often grown as an outer coating on a nickel-based superalloy by exposing the superalloy substrate to an aluminum-rich environment at elevated temperatures. The aluminum diffuses into the substrate and combines with the nickel to form a coating of NiAl on the outer surface. A platinum-containing nickel aluminide (Pt—NiAl) coating is often formed by electroplating platinum over the nickel-base substrate to a predetermined thickness, followed by exposing the platinum-coated substrate to an aluminum-rich environment at elevated temperatures. In addition to aluminide coatings, MCrAl(X) coatings, where M is at least one of Ni, Co, and Fe, and wherein X is at least one of yttrium (Y), tantalum (Ta), silicon (Si), hafnium (Hf), titanium (Ti), zirconium (Zr), boron (B), carbon (C), are commonly used as bondcoats for a TBC system and as environmental coatings. MCrAl(X) coatings are suitable for application by any of a number of processes, including plasma spraying, high-velocity oxy-fuel (HVOF) spraying, and physical and chemical vapor deposition, as non-limiting examples.

The coatings noted above comprise relatively high amounts of Al with respect to the superalloy substrate, while the superalloy substrate is relatively rich in certain elements, such as, for example, Co and refractory elements such as W, Re, Ta, Mo, and Ti, that are not present or are present in relatively small amounts in the coating. The concentration gradient in Al and other elements that results when the coating is deposited directly on the superalloy substrate causes solid-state diffusion to occur across the substrate/coating interface when the substrate is exposed to high temperatures, such as those found in gas turbine engines during service. The migration of elements across the interface alters the chemical composition and microstructure of both the coating and the substrate in regions adjacent to the interface ("diffusion zones"), resulting in generally deleterious effects on the properties of both the coating and the substrate. For example, migration of Al out of the diffusion zone of the coating detracts from its effectiveness as an oxidation-resistant material, while the accumulation of Al in the diffusion zone of the substrate converts the Y-Y' superalloy structure into one with drastically reduced load-carrying capability. As time passes, and more material migrates across the interface, the size of the diffusion zones in both the coating and the substrate increases ("diffusion zone growth"), leading to significant degradation in the performance of a coated superalloy component.

One solution to the problem of diffusion zone growth in gas turbine engine components is the use of a diffusion barrier layer, interposed between the substrate and the environmental coating, as set forth in U.S. Pat. No. 6,306,524. In part, '524 sets forth certain alloys of ruthenium (Ru) with Ni, Co, Cr and mixtures thereof that can be effective as barriers to the diffusion of Al and other elements, thereby prolonging the life of coated gas turbine engine components by significantly the formation and growth of diffusion zones during service.

SUMMARY OF INVENTION

Although effective as diffusion barriers, some of the alloys set forth in '524 lack the oxidation resistance needed for optimum performance in state-of-the-art gas turbine engines. Therefore, there is a need to provide material compositions and coating systems with high oxidation resistance and high resistance to solid-state diffusion of Al and other elements found in superalloys. Embodiments of the present invention address this need.

One embodiment is an alloy for use in a high-temperature, oxidative environment, comprising, in atomic percent: from about 20% to about 80% ruthenium (Ru), from about 2% to about 15% aluminum (Al), up to about 15% chromium (Cr); and the balance comprising at least one of nickel (Ni), cobalt (Co), and mixtures thereof.

A second embodiment is an alloy for use in a high-temperature, oxidative environment, comprising, in atomic percent: at least about 80% ruthenium (Ru), from about 2% to about 20% aluminum (Al), up to about 20% chromium (Cr), and the balance comprising at least one of nickel (Ni), cobalt (Co), and mixtures thereof.

A third embodiment is an alloy for use in a high-temperature, oxidative environment, comprising, in atomic percent: from about 60% to about 85% ruthenium (Ru), from about 15% to about 40% aluminum (Al), up to about 25% chromium (Cr), and up to about 25% of at least one of nickel (Ni), cobalt (Co), and mixtures thereof.

A fourth embodiment is a protective coating system for protecting an article from a high-temperature, oxidative environment. The protective coating system comprises a diffusion barrier layer comprising an alloy selected from the group (hereinafter referred to as "the composition group") consisting of the following: an alloy comprising, in atomic percent, from about 20% to about 80% ruthenium (Ru), from about 2% to about 15% aluminum (Al), up to about 15% chromium (Cr), and the balance comprising at least one of nickel (Ni), cobalt (Co), and mixtures thereof; an alloy comprising, in atomic percent, at least about 80% Ru, from about 2% to about 20% Al, up to about 20% Cr, and the balance comprising at least one of Ni, Co, and mixtures thereof; an alloy comprising, in atomic percent, from about 60% to about 85% Ru, from about 15% to about 40% Al, up to about 25% Cr, and up to about 25% of at least one of Ni, Co, and mixtures thereof; and an alloy comprising, in atomic percent, from about 20% to about 45% Ru, from about 15% to about 40% Cr, from about 2% to about 50% Al, and the balance comprising at least one of Ni, Co, and mixtures thereof.

A fifth embodiment is an article for use in a high-temperature, oxidative environment. The article comprises a substrate and a diffusion barrier layer disposed on the substrate. The diffusion barrier layer comprises an alloy selected from the aforementioned composition group.

A sixth embodiment is a method for protecting an article from exposure to a high-temperature, oxidative environment. The method comprises providing a substrate, and disposing a diffusion barrier layer on said substrate. The diffusion barrier layer comprises an alloy selected from the aforementioned composition group.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The discussion herein employs examples taken from the gas turbine industry, particularly the portions of the gas turbine industry concerned with the design, manufacture, operation, and repair of aircraft engines and power generation turbines. However, the scope of the invention is not limited to only these specific industries, as the embodiments of the present invention are applicable to many and various applications that require materials resistant to high temperature and aggressive environments. Unless otherwise noted, the temperature range of interest where statements and comparisons are made concerning material properties is from about 950° C. to about 1300° C. The term "high temperature" as used herein refers to temperatures above about 950° C.

Figure 1:
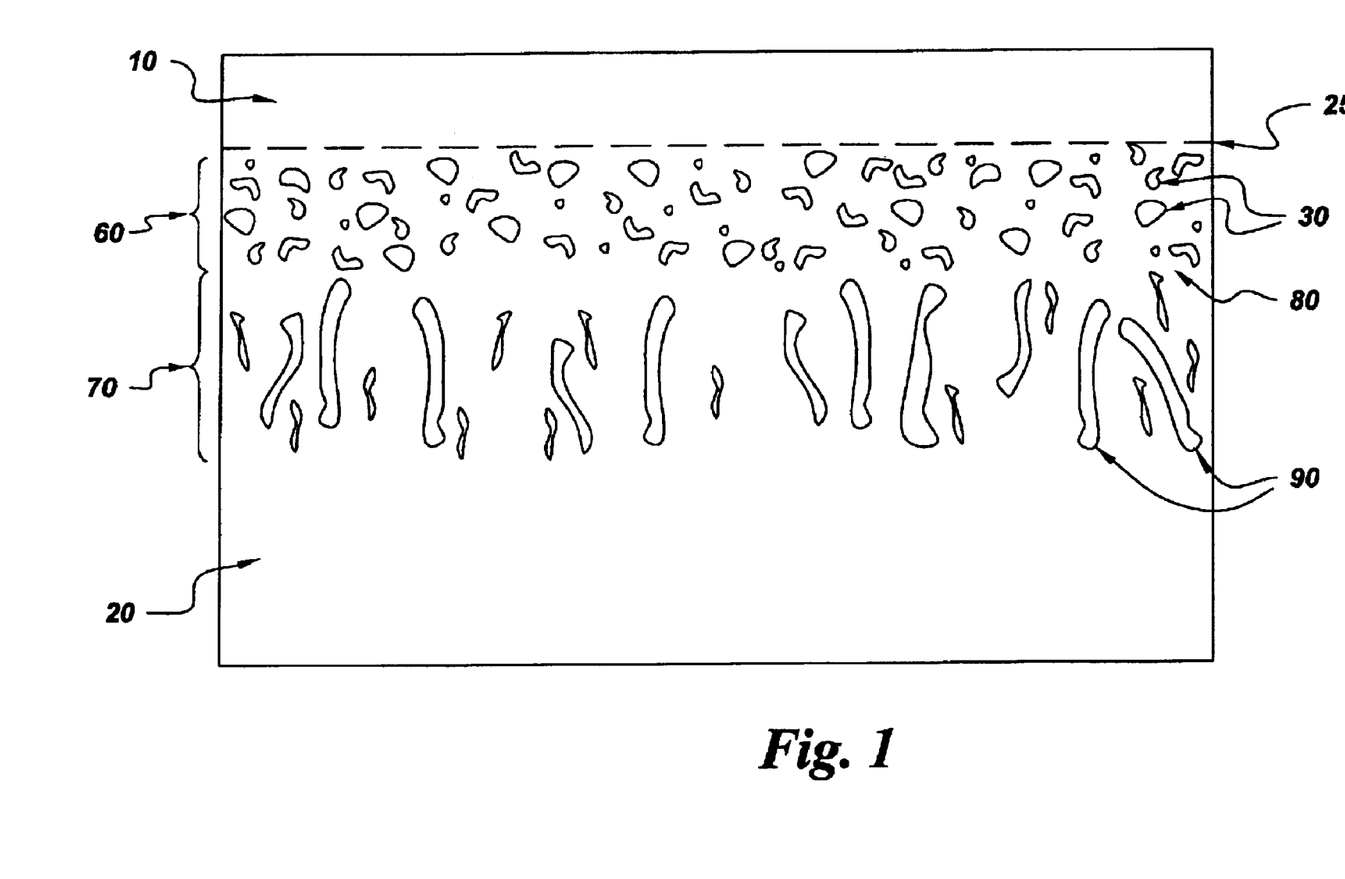
FIG. 1 is a schematic diagram of the various forms of diffusion zone growth.

Referring to FIG. 1, interdiffusion between an environmental coating 10 and superalloy substrate 20 drives a transformation in the substrate diffusion zone, wherein the formation and growth of topologically close-packed (TCP) phases 30 become thermodynamically favored over that of the original Y matrix phase and Y' precipitate phase present in the superalloy 20 prior to reaction with the coating 10. The region 60 corresponding to the above situation is referred to as the "primary diffusion zone" (PDZ). In many state-of-the-art superalloys, especially those alloys with significant additions of refractory elements such as, for example, Re, W, and Hf, a second, distinct zone of transformation is observed. This so-called "secondary reaction zone" (SRZ) 70 comprises a Y' matrix phase 80 with needle-shaped precipitate phases 90 of Y and TCP phase. Diffusion of Al and Cr into the superalloy 20 from the coating 10 has been shown to promote the formation of TCP phases and SRZ growth. The formation of PDZ and SRZ in coated superalloys degrades the properties of the superalloy by reducing the effective load-bearing cross-section, that is, the cross-sectional area fraction of Y-Y' microstructure, of the alloy.

Embodiments of the present invention address the problem of PDZ and SRZ formation in superalloys, as well as the problem of providing a material that possesses excellent diffusion barrier properties in addition to substantial resistance to oxidation. Oxidation resistance allows the material to resist degradation during service thermal exposures, thereby extending the life of the material over that generally observed for current alloys. The term "diffusion barrier" is used herein to refer to a material that, when disposed as a coating layer 10 over a substrate 20 such that a concentration gradient exists across the coating/substrate interface 25 for at least one of Al and Cr, reduces the migration of Al and Cr across the interface 25 by a factor of at least 2 relative to the amount of migration, as measured by the thickness of the diffusion zone, observed under similar conditions (e.g., similar concentration gradients temperatures, and times) where the diffusion barrier 10 is absent. Advantageously, diffusion barriers as set forth in embodiments of the present invention also provide a similar degree of reduction in the migration of elements, such as, for example, W, Re, Ti, Mo, Ta, Hf, and Co, from the superalloy into the coating. The diffusion barrier materials of the present invention are also relatively thermodynamically and kinetically stable at high temperatures, such as, for example, the service temperatures encountered by the metal components of a gas turbine engine.

Certain embodiments of the present invention set forth alloys for use in a high temperature, oxidative environment. Generally, the alloys of the present invention comprise at least one of Ru, Cr, Al, Ni, and Co. Ru provides good diffusion barrier properties and oxidation resistance, while Al and Cr further enhance the oxidation resistance. Ni and Co additions to the alloy enhance the compatibility of the material with superalloy substrates, in terms of properties such as, for example, thermal expansion coefficient. The specific elements and their amounts present in particular alloys will depend on various factors. These include: the particular composition of the substrate and any coating applied over the barrier coating; the intended end use for the article (e.g., a turbine part); the expected temperature and temperature patterns which the article itself will be subjected; and the desired service life of the barrier coating.

One alloy of the present invention comprises, in atomic percent, from about 20% to about 80% ruthenium (Ru), from about 2% to about 15% aluminum (Al), up to about 15% chromium (Cr), and the balance comprising at least one of nickel (Ni), cobalt (Co), and mixtures thereof. This alloy is referred to herein as "Composition 1." The term "balance" as used herein is used as is common in the art to refer to that amount needed to make up the difference between 100% and the sum of all other alloy constituents. Those skilled in the art will appreciate that a "balance" as used herein can be any number from 0% to 100%, depending on the magnitude of the sum of the other alloy constituents. In particular embodiments of this alloy, the alloy comprises, in atomic percent, from about 30% to about 80% Ru, from about 4% to about 10% Al, from about 2% to about 12% Cr, and the balance comprising at least one of nickel (Ni), cobalt (Co), and mixtures thereof. More specific embodiments of this alloy comprise, in atomic percent, from about 40% to about 60% Ru, from about 4% to about 8% Al, from about 5% to about 12% Cr, and the balance comprising at least one of nickel (Ni), cobalt (Co), and mixtures thereof. This alloy is relatively ductile and it is especially suited for applications where strain tolerance of the coating is critical.

Another alloy of the present invention comprises, in atomic percent, at least about 80% ruthenium (Ru), from about 2% to about 20% aluminum (Al), up to about 20% chromium (Cr), and the balance comprising at least one of nickel (Ni), cobalt (Co), and mixtures thereof. This alloy is referred to herein as "Composition 2." Particular embodiments of this alloy comprise, in atomic percent, at least about 80% ruthenium (Ru), from about 2% to about 15% aluminum (Al), from about 2% to about 10% chromium (Cr) and the balance comprising at least one of nickel (Ni), cobalt (Co), and mixtures thereof. In more specific embodiments, the alloy comprises, in atomic percent, at least about 80% ruthenium (Ru), from about 3% to about 8% aluminum (Al), from about 3% to about 8% chromium (Cr), and the balance comprising at least one of nickel (Ni), cobalt (Co), and mixtures thereof. This alloy is a very effective diffusion barrier, and is suitable for use even as a relatively thin layer.

A third alloy ("Composition 3") of the present invention comprises, in atomic percent, from about 60% to about 85% ruthenium (Ru), from about 15% to about 40% aluminum (Al), up to about 25% chromium (Cr), and up to about 25% of at least one of nickel (Ni), cobalt (Co), and mixtures thereof. In particular embodiments, the alloy comprises, in atomic percent, from about 60% to about 85% ruthenium (Ru), from about 18% to about 35% aluminum (Al), from about 5% to about 15% chromium (Cr), and up to about 17% of at least one of nickel (Ni), cobalt (Co), and mixtures thereof. More specific embodiments of the alloy comprise, in atomic percent, from about 60% to about 80% ruthenium (Ru), from about 20% to about 30% aluminum (Al), from about 8% to about 10% chromium (Cr), and up to about 12% of at least one of nickel (Ni), cobalt (Co), and mixtures thereof. This alloy has very good oxidation resistance in addition to being an effective diffusion barrier, and as such is suitable for use with a thin environmental coating or as a bond coat directly beneath the TBC.

Another embodiment of the present invention is a protective coating system for protecting an article from a high-temperature, oxidative environment. The protective coating system comprises a diffusion barrier layer comprising an alloy selected from the group consisting of the aforementioned Composition 1, Composition 2, and Composition 3, and a fourth alloy composition ("Composition 4"). In certain embodiments, the thickness of the diffusion barrier layer is from about 5 to about 100 microns thick. Composition 4 is an alloy comprising in atomic percent, from about 20% to about 45% Ru, from about 15% to about 40% Cr, from about 2% to about 50% Al, and the balance comprising at least one of Ni, Co, and mixtures thereof.

Composition 4 provides an excellent thermal expansion match to the superalloy substrate, resulting in low thermal stresses at the coating-substrate interface. Certain embodiments of the protective coating system comprise diffusion barrier layers of particular compositions within the ranges specified by Composition 4. For example, in certain embodiments, the alloy of the diffusion barrier comprises, in atomic percent, from about 25% to about 45% Ru, from about 15% to about 35% Cr, from about 5% to about 40% Al, with the balance comprising at least one of Ni, Co, and mixtures thereof. In more specific embodiments, the alloy of the diffusion barrier comprises, in atomic percent, from about 30% to about 45% Ru, from about 20% to about 35% Cr, from about 5% to about 35% Al, with the balance comprising at least one of Ni, Co, and mixtures thereof.

As mentioned above, the diffusion barrier layer is used to protect an alloy substrate from the damaging effects of PDZ and SRZ formation and growth. In certain embodiments, other coating layers are included to enhance the overall effectiveness of the protective coating system. For example, in some embodiments, the protective coating system further comprises a thermal barrier coating (TBC) disposed over the diffusion barrier layer. The TBC, which in certain embodiments is at least about 100 microns thick, is used to afford enhanced thermal resistance to the surface of the protective coating system, thereby lowering the effective exposure temperature to the coating system and the underlying substrate. Alternatively, the protective coating system, in some embodiments, further comprises a layer of oxidation-resistant material disposed over the diffusion barrier layer. The term "oxidation-resistant material" is used herein to refer to a material having an oxidation resistance that is higher than that of nickel-based superalloys. In certain embodiments, the layer of oxidation-resistant material has a thickness in the range from about 25 microns to about 100 microns. In some embodiments, the oxidation-resistant material comprises aluminum, which generally provides oxidation resistance to underlying metal by forming a dense, adherent, protective layer of aluminum oxide on an exposed surface. For example, in certain embodiments, the oxidation-resistant material comprises an aluminide, and in particular embodiments of this type, the oxidation-resistant material further comprises platinum. Non-limiting examples of possible aluminide materials include NiAl and Pt-NiAl, as described above. In other embodiments, the oxidation-resistant material comprises a material of general formula MCrAl(X), wherein M is at least one of nickel, cobalt, and iron, and wherein X is at least one of yttrium (Y), tantalum (Ta), silicon (Si), hafnium (Hf), titanium (Ti), zirconium (Zr), boron (B), carbon (C). The addition of the oxidation-resistant layer to the protective coating system of the present invention further enhances the ability of the coating system to avoid degradation by oxidation during exposure to high temperature gas, thereby extending the life expectancy of the protective coating system.

In a further embodiment, the layer of oxidation-resistant material is disposed between the diffusion barrier layer and a TBC, combining the advantages of these two additional materials to enhance the overall performance of the protective coating system. A particular embodiment of this type that exploits these combined advantages is a protective coating system comprising a diffusion barrier layer comprising the aforementioned Composition 4; a layer of oxidation-resistant material, the material comprising an aluminide, disposed over the diffusion barrier layer; and a thermal barrier coating disposed over the layer of oxidation-resistant material.

Figure 2:
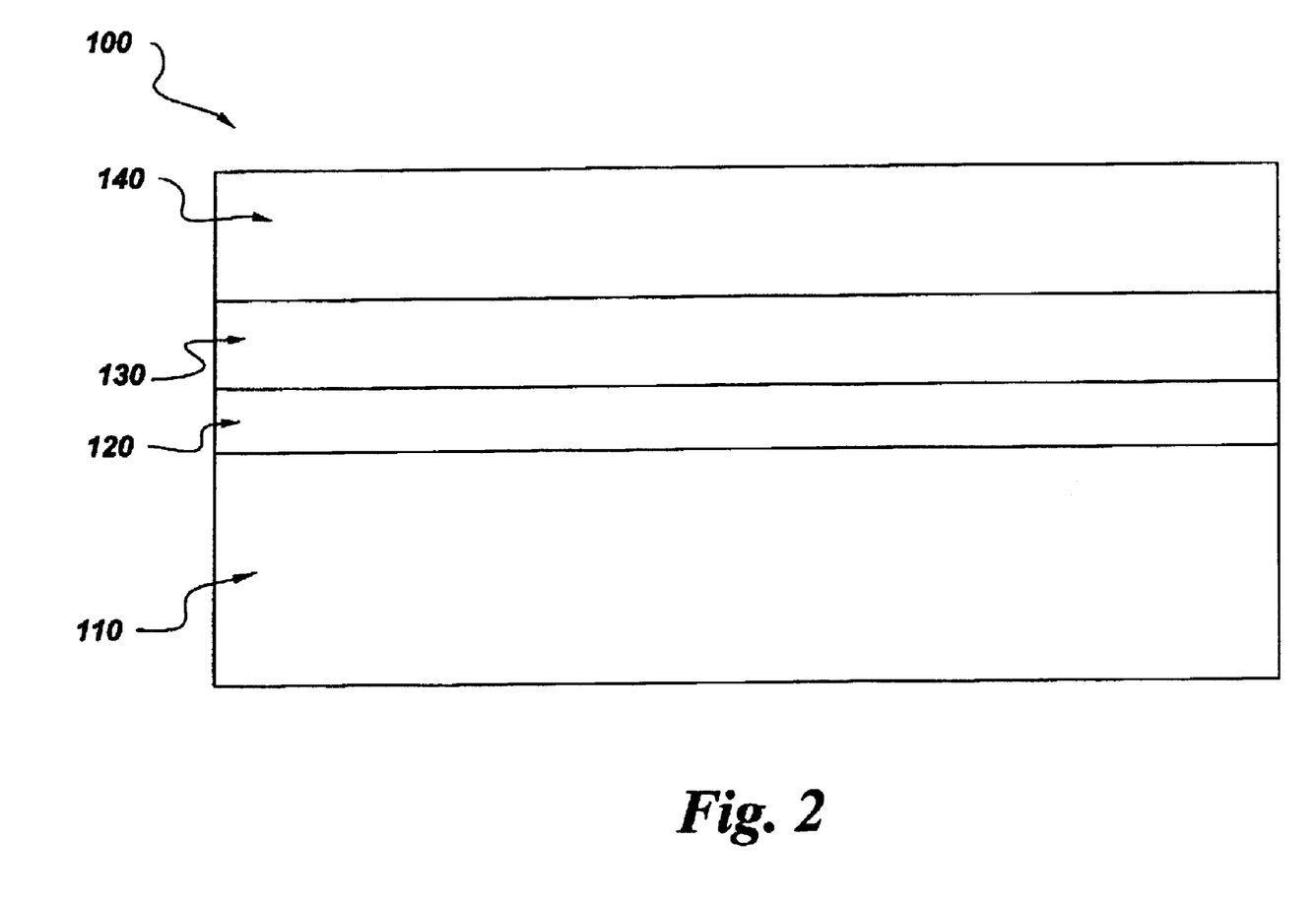
FIG. 2 illustrates an article comprising a protective coating system according to embodiments of the present invention.

Other embodiments of the present invention include an article for use in a high-temperature oxidative environment. Referring to FIG. 2, the article 100 comprises a substrate 110; and a diffusion barrier layer 120 disposed on the substrate 110, the diffusion barrier layer 120 comprising an alloy selected from the group consisting of the aforementioned Composition 1, Composition 2, Composition 3, and Composition 4. The substrate 110 is a superalloy in some embodiments, and in particular embodiments the superalloy is a nickel-based superalloy comprising at least one refractory metal selected from the group consisting of tungsten, rhenium, tantalum, hafnium, molybdenum, niobium, and zirconium. As described above, the presence of such elements promotes the susceptibility of the superalloy to SRZ growth if diffusion processes accumulate Al and Cr in the diffusion zone of the superalloy; thus the need for the diffusion barrier coatings as described herein. In certain embodiments, the article 100 further comprises a layer of oxidation-resistant material 130 disposed over the diffusion barrier layer 120. Alternatives for the oxidation-resistant material are the same as those set forth above for the protective coating system. A TBC 140 is disposed over the layer of oxidation-resistant material 130 in certain embodiments for which enhanced thermal protection is desired.

In particular embodiments, the substrate 110 further comprises a gas turbine engine component, and in specific embodiments the gas turbine engine component is a component selected from the group consisting of a turbine blade, a vane, a transition piece, and a combustor. A particular embodiment that employs the advantages of the present invention is a gas turbine engine component comprising a substrate comprising a gas turbine engine component, the component comprising a nickel-based superalloy; a diffusion barrier layer disposed over the substrate, the diffusion barrier layer comprising an alloy comprising the aforementioned Composition 4; a layer of oxidation-resistant material, the material comprising an aluminide, disposed over the diffusion barrier layer; and a thermal barrier coating disposed over the layer of oxidation-resistant material.

A further embodiment of the present invention is a method for protecting an article from exposure to a high-temperature, oxidative environment, the method comprising providing a substrate, and disposing a diffusion barrier layer on the substrate, the diffusion barrier layer comprising an alloy selected from the group consisting of the aforementioned Composition 1, Composition 2, Composition 3, and Composition 4. As in embodiments described above, the substrate, in certain embodiments, comprises a superalloy that comprises at least one of the aforementioned refractory metals. In some applications, providing the substrate comprises providing a gas turbine engine component, which for certain embodiments is a component selected from the alternatives described above.

For certain embodiments, the method further comprises disposing a layer of oxidation-resistant material over the diffusion barrier layer. In particular embodiments where additional thermal protection is desirable, the method further comprises disposing a thermal barrier coating over said layer of oxidation-resistant material. A specific embodiment of the present invention that exploits the advantages as set forth above is a method for protecting a gas turbine engine component, the method comprising providing a gas turbine engine component; disposing a diffusion barrier layer on the component, the diffusion barrier layer comprising an alloy comprising the aforementioned Composition 4; disposing a layer of oxidation-resistant material over the diffusion barrier layer, the oxidation-resistant material comprising an aluminide; and disposing a thermal barrier coating over the layer of oxidation-resistant material.

Alloys set forth herein as embodiments of the present invention are made using any of the various traditional methods of metal production and forming. Traditional casting, powder metallurgical processing, directional solidification, and single-crystal solidification are non-limiting examples of methods suitable for forming ingots of these alloys. Thermal and thermo-mechanical processing techniques common in the art for the formation of other alloys are suitable for use in manufacturing the alloys of the present invention. Several embodiments of the present invention pertain to the use of coatings of at least one of the following: diffusion barrier alloys, oxidation-resistant materials, and thermal barrier materials. Each of these coatings, as envisioned for use in embodiments of the present invention, is suitable to be manufactured using any of several coating techniques, including, for example, diffusion coating techniques, physical vapor deposition, chemical vapor deposition, plasma spraying, and HVOF spraying. Oxidation-resistant materials such as aluminides and MCrAl(X) coatings may be deposited by any of the techniques commonly used in the art for the production of these coatings.

Additionally, for certain embodiments of the present invention the diffusion barrier layer is disposed by a process comprising disposing a layer of ruthenium (Ru) on the substrate and heating the substrate to react the Ru with the substrate to form the diffusion barrier layer. For example, a layer of Ru is deposited onto the superalloy substrate by any suitable deposition process, such as, for example, electroplating, sputtering, electron-beam physical vapor deposition, or ion plasma deposition. Oxidation-resistant material comprising aluminum is then disposed over the layer of Ru, and then the coated substrate is heated at a suitable temperature, such as, for example, about 1200° C. for a suitable reaction time, such as, for example, greater than about 30 minutes. During heating, Ni and Cr from the substrate, along with Al from the layer of oxidation-resistant material will diffuse into the layer of Ru and react with it to form a composition according to embodiments of the present invention.

The following example is presented to demonstrate exemplary results obtained with one alloy of the present invention and is not to be considered as limiting the scope of the present invention in any way.

An alloy with a composition according to embodiments of the present invention was manufactured by arc-melting to form a target suitable for use in an ion plasma deposition (IPD) apparatus. The alloy had a composition, in atomic percent, of about 43% Ni, about 43% Ru, about 9% Cr, about 5% Al, plus incidental impurities. The target was then used in an IPD process to deposit a diffusion barrier layer of about 15 microns thickness onto a first substrate button, 25 mm in diameter and comprising a nickel-based superalloy. A second coating layer of aluminum-rich material was then deposited onto this button at a thickness of 40 microns over the diffusion barrier layer. The aluminum-rich material had a composition, in atomic percent, of about 54% Ni, about 40% Al, about 6% Cr, plus incidental impurities. The resulting substrate with two coating layers is herein referred to as "Specimen A." For comparison, the aluminum-rich material was also deposited at a thickness of about 40 microns directly onto a second substrate of the same size and composition as used to make Specimen A, without an intervening diffusion barrier layer. The resulting substrate with only the Al-rich material deposited onto the substrate button is herein referred to as "Specimen B." Specimens A and B were then heat treated at about 1100° C. for about 400 hours, then removed from the heat, cross-sectioned, and metallographically examined for evidence of diffusion zone formation. Specimen B, the specimen without the diffusion barrier layer, had a diffusion zone (including PDZ zone and SRZ zone) of 180 micron thickness, whereas Specimen A, the specimen with the diffusion barrier layer according to embodiments of the present invention had a diffusion zone of 10 microns and was free from SRZ formation.

While various embodiments are described herein, it will be appreciated from the specification that various combinations of elements, variations, equivalents, or improvements therein may be made by those skilled in the art, and are still within the scope of the invention as defined in the appended claims.

What is claimed is:

1. An alloy for use in a high-temperature, oxidative environment, comprising, in atomic percent:
    from about 20% to about 80% ruthenium (Ru);
    from about 2% to about 15% aluminum (Al);
    up to about 15% chromium (Cr); and
    the balance comprising at least one of nickel (Ni), cobalt (Co), and mixtures thereof.

2. The alloy of claim 1, wherein said alloy comprises, in atomic percent:
    from about 30% to about 80% Ru;
    from about 4% to about 10% Al;
    from about 2% to about 12% Cr; and the balance comprising at least one of nickel (Ni), cobalt (Co), and mixtures thereof.

3. The alloy of claim 2, comprising, in atomic percent:
    from about 40% to about 60% Ru;
    from about 4% to about 80% Al;
    from about 5% to about 12% Cr; and the balance comprising at least one of nickel (Ni), cobalt (Co), and mixtures thereof.

4. An alloy for use in a high-temperature, oxidative environment, comprising, in atomic percent:
    at least about 80% ruthenium (Ru);
    from about 20% to about 20% aluminum (Al);
    up to about 20% chromium (Cr); and
    the balance comprising at least one of nickel (Ni), cobalt (Co), and mixtures thereof.

5. The alloy of claim 4, comprising, in atomic percent:
    at least about 80% ruthenium (Ru);
    from about 2% to about 15% aluminum (Al);
    from about 2% to about 10% chromium (Cr); and
    the balance comprising at least one of nickel (Ni), cobalt (Co), and mixtures thereof.

6. The alloy of claim 5, comprising, in atomic percent:
    at least about 80% ruthenium (Ru);
    from about 3% to about 8% aluminum (Al);
    from about 3% to about 8% chromium (Cr); and
    the balance comprising at least one of nickel (Ni), cobalt (Co), and mixtures thereof.

7. An alloy for use in a high-temperature, oxidative environment, comprising, in atomic percent:
    from about 60% to about 85% ruthenium (Ru);
    from about 15% to about 40% aluminum (Al);
    up to about 25% chromium (Cr); and
    up to about 25% of at least one of nickel (Ni), cobalt (Co), and mixtures thereof.

8. The alloy of claim 7, comprising, in atomic percent:
    from about 60% to about 85% ruthenium (Ru);
    from about 18% to about 35% aluminum (Al);
    from about 5% to about 15% chromium (Cr); and
    up to about 17% of at least one of nickel (Ni), cobalt (Co), and mixtures thereof.

9. The alloy of claim 8, comprising, in atomic percent:
    from about 60% to about 80% ruthenium (Ru);
    from about 20% to about 30% aluminum (Al);
    from about 8% to about 10% chromium (Cr); and
    up to about 12% of at least one of nickel (Ni), cobalt (Co), and mixtures thereof.

10. A protective coating system for protecting an article from a high-temperature, oxidative environment, said protective coating system comprising:
    a diffusion barrier layer comprising an alloy selected from the group consisting of
        a. an alloy comprising, in atomic percent, from about 20% to about 80% ruthenium (Ru), from about 2% to about 15% aluminum (Al), up to about 15% chromium (Cr), and the balance comprising at least one of nickel (Ni), cobalt (Co), and mixtures thereof;
        b. an alloy comprising, in atomic percent, at least about 80% Ru, from about 2% to about 20% Al, up to about 20% Cr, and the balance comprising at least one of Ni, Co, and mixtures thereof; and
        c. an alloy comprising, in atomic percent, from about 60% to about 85% Ru, from about 15% to about 40% Al, up to about 25% Cr, and up to about 25% of at least one of Ni, Co, and mixtures thereof.

11. The protective coating system of claim 10, further comprising a thermal barrier coating disposed over said diffusion barrier layer.

12. The protective coating system of claim 10, said protective coating system further comprising a layer of oxidation-resistant material disposed over said diffusion barrier layer.

13. The protective coating system of claim 12, wherein said oxidation-resistant material comprises aluminum.

14. The protective coating system of claim 13, wherein said oxidation-resistant material comprises an aluminide.

15. The protective coating system of claim 14, wherein said oxidation-resistant material further comprises platinum (Pt).

16. The protective coating system of claim 12, wherein said oxidation-resistant material comprises a material of general formula MCrAl(X), wherein M is at least one of nickel, cobalt, and iron, and wherein X is at least one of yttrium (Y), tantalum (Ta), silicon (Si), hafnium (Hf), titanium (Ti), zirconium (Zr), boron (B), carbon (C).

17. The protective coating system of claim 12, further comprising a thermal barrier coating, wherein said layer of oxidation-resistant material is disposed between said diffusion barrier layer and said thermal barrier coating.

18. A protective coating system for protecting an article from a high-temperature, oxidative environment, said protective coating system comprising:
    a diffusion barrier layer comprising, in atomic percent, from about 20% to about 45% Ru, from about 15% to about 40% Cr, from about 20% to about 50% Al, and the balance comprising at least one of Ni, Co, and mixtures thereof;
    a layer of oxidation-resistant material, said material comprising an alumiide, disposed over said diffusion barrier layer; and a thermal barrier coating disposed over said layer of oxidation-resistant material.

19. An article for use in a high-temperature, oxidative environment, comprising:
a substrate; and
a diffusion barrier layer disposed on said substrate, said diffusion barrier layer comprising an alloy selected from the group consisting of
  a. an alloy comprising, in atomic percent, from about 20% to about 80% ruthenium (Ru), from about 2% to about 15% aluminum (Al), up to about 15% chromium (Cr), and the balance comprising at least one of nickel (Ni), cobalt (Co), and mixtures thereof;
  b. an alloy comprising, in atomic percent, at least about 80% Ru, from about 20% to about 20% Al, up to about 20% Cr, and the balance comprising at least one of Ni, Co, and mixtures thereof; and
  c. an alloy comprising, in atomic percent, from about 60% to about 85% Ru, from about 15% to about 40% Al, up to about 25% Cr, and up to about 25% of at least one of Ni, Co, and mixtures thereof.

20. The article of claim 19, further comprising a layer of oxidation-resistant material disposed over said diffusion barrier layer.

21. The article of claim 20, wherein said oxidation-resistant material comprises aluminum.

22. The article of claim 20, further comprising a thermal barrier coating disposed over said layer of oxidation-resistant material.

23. The article of claim 19, wherein said substrate comprises a superalloy.

24. The article of claim 23, wherein said superalloy is a nickel-based superalloy comprising at least one refractory metal selected from the group consisting of tungsten, rhenium, tantalum, hafnium, molybdenum, niobium, and zirconium.

25. The article of claim 23, wherein said substrate further comprises a gas turbine engine component.

26. The article of claim 25, wherein said gas turbine engine component is a component selected from the group consisting of a turbine blade, a vane, a transition piece, and a combustor.

27. A gas turbine engine component comprising:
a substrate comprising a gas turbine engine component, said component comprising a nickel-based superalloy;
a diffusion barrier layer disposed over said substrate, said diffusion barrier layer comprising an alloy comprising, in atomic percent, from about 20% to about 45% Ru, from about 15% to about 40% Cr, from about 2% to about 50% Al, and the balance comprising at least one of Ni, Co, and mixtures thereof,
a layer of oxidation-resistant material, said material comprising an aluminide, disposed over said diffusion barrier layer; and
a thermal barrier coating disposed over said layer of oxidation-resistant material.

28. A method for protecting an article from exposure to a high-temperature, oxidative environment, said method comprising:
providing a substrate; and
disposing a diffusion barrier layer on said substrate, said diffusion barrier layer comprising an alloy selected from the group consisting of
  a. an alloy comprising, in atomic percent, from about 20% to about 80% ruthenium (Ru), from about 2% to about 15% aluminum (Al), up to about 15% chromium (Cr), and the balance comprising at least one of nickel (Ni), cobalt (Co), and mixtures thereof,
  b. an alloy comprising, in atomic percent, at least about 80% Ru, from about 20% to about 20% Al, up to about 20% Cr, and the balance comprising at least one of Ni, Co, and mixtures thereof, and
  c. an alloy comprising, in atomic percent, from about 60% to about 85% Ru, from about 15% to about 40% Al, up to about 25% Cr, and up to about 25% of at least one of Ni, Co, and mixtures thereof.

29. The method of claim 28, wherein providing a substrate comprises providing a nickel-based superalloy substrate, said superalloy substrate comprising at least one refractory metal selected from the group consisting of tungsten, rhenium, tantalum, hafnium, molybdenum, niobium, and zirconium.

30. The method of claim 28, further comprising disposing a layer of oxidation-resistant material over said diffusion barrier layer.

31. The method of claim 30, wherein disposing said layer of oxidation-resistant material comprises disposing a layer comprising aluminum.

32. The method of claim 31, wherein disposing said diffusion barrier layer comprises disposing a layer of ruthenium (Ru) on said substrate prior to the disposition of said layer of oxidation-resistant material, and heating said substrate after disposition of said layer of oxidation-resistant material to react said Ru with said substrate and said layer of oxidation-resistant material to form said diffusion barrier layer.

33. The method of claim 30, further comprising disposing a thermal barrier coating over said layer of oxidation-resistant material.

34. The method of claim 28, wherein providing said substrate comprises providing a gas turbine engine component.

35. The method of claim 34, wherein said gas turbine engine component is a component selected from the group consisting of a turbine blade, a vane, a transition piece, and a combustor.

36. A method for protecting a gas turbine engine component, said method comprising:
providing a gas turbine engine component;
disposing a diffusion barrier layer on said component, said diffusion barrier layer comprising an alloy comprising, in atomic percent, from about 20% to about 45% Ru, from about 15% to about 40% Cr, from about 2% to about 50% Al, and the balance comprising at least one of Ni, Co, and mixtures thereof;
disposing a layer of oxidation-resistant material over said diffusion barrier layer, said oxidation-resistant material comprising an aluminide; and
disposing a thermal barrier coating over said layer of oxidation-resistant material.

37. A protective coating system for protecting an article from a high-temperature, oxidative environment, said protective coating system comprising:
a diffusion barrier layer comprising an alloy, said alloy comprising, in atomic percent, from about 20% to about 45% Ru, from about 15% to about 40% Cr, from about 2% to about 50% Al, and the balance comprising at least one of Ni, Co, and mixtures thereof; and
at least one additional layer disposed over said diffusion barrier layer, said at least one additional layer comprising at least one of a layer of oxidation-resistant material and a thermal barrier coating.

38. The protective coating system of claim 37, wherein said alloy of said diffusion barrier layer comprises, in atomic percent, from about 25% to about 45% Ru, from about 15% to about 35% Cr, from about 50% to about 40% Al, and the balance comprising at least one of Ni, Co, and mixtures thereof.

39. The protective coating system of claim 38, wherein said alloy of said diffusion barrier layer comprises, in atomic percent, from about 30% to about 45% Ru, from about 20% to about 35% Cr, from about 5% to about 35% Al, and the balance comprising at least one of Ni, Co, and mixtures thereof.

40. The protective coating system of claim 37, whereln said oxidation-resistant material comprises aluminum.

41. The protective coating system of claim 40, wherein said oxidation-resistant material comprises an aluminide.

42. The protective coating system of claim 41, wherein said oxidation-resistant material further comprises platinum (Pt).

43. The protective coating system of claim 40, wherein said oxidation-resistant material comprises a material of general formula MCrAl(X), wherein M is at least one of nickel, cobalt, and iron, and wherein X is at least one of yttrium (Y), tantalum (Ta), silicon (Si), hafnium (Hf), titanium (Ti), zirconium (Zr), boron (B), carbon (C).

44. An article for use in a high-temperature, oxidative environment, comprising:

a substrate; and a diffusion barrier layer disposed on said substrate, said diffusion barrier layer comprising an alloy, said alloy comprising, in atomic percent, from about 20% to about 45% Ru, from about 15% to about 40% Cr, from about 2% to about 50% Al, and the balance comprising at least one of Ni, Co, and mixtures thereof; and a layer of oxidation-resistant material disposed over said diffusion barrier layer.

45. The article of claim 44, wherein said oxidation resistant material comprises at least one of a. an aluminide, and b. a material of general formula MCrAl(X), wherein M is at least one of nickel, cobalt, and iron, and wherein X is at least one of yttrium (Y), tantalum (Ta), silicon (Si), hafnium (Hf), titanium (Ti), zirconium (Zr), boron (B), carbon (C).

46. The article of claim 45, further comprising a thermal barrier coating disposed over said layer of oxidation-resistant material.

47. The article of claim 44, wherein said substrate comprises a superalloy.

48. A method for protecting an article from exposure to a high-temperature, oxidative environment, said method comprising:

providing a substrate; and disposing a diffusion barrier layer on said substrate, said diffusion barrier layer comprising an alloy, said alloy comprising, in atomic percent, from about 20% to about 45% Ru, from about 15% to about 40% Cr, from about 2% to about 50% Al, and the balance comprising at least one of Ni, Co, and mixtures thereof; and disposing a layer of oxidation-resistant material over said diffusion barrier layer.

49. The method of claim 48, wherein said oxidation resistant material comprises at least one of a. an aluminide, and b. a material of general formula MCrAl(X), wherein M is at least one of nickel, cobalt, and iron, and wherein X is at least one of yttrium (Y), tantalum (Ta), silicon (Si), hafnium (Hf), titanium (Ti), zirconium (Zr), boron (B), carbon (C).

* * * * *

UNITED STATES PATENT AND TRADEMARK OFFICE
CERTIFICATE OF CORRECTION

PATENT NO.    : 6,720,088 B2
DATED         : April 13, 2004
INVENTOR(S)   : Ji-Cheng Zhao et al.

It is certified that error appears in the above-identified patent and that said Letters Patent is hereby corrected as shown below:

Column 9,
Line 35, "from about 4% to about 80% Al;" should read -- from about 4% to about 8% Al; --
Line 43, "from about 20% to about 20% aluminum (Al);" should read -- from about 2% to about 20% aluminum (Al); --

Column 10,
Line 62, "about 40% Cr, from about 20% to about 50% Al, and" should read -- about 40% Cr, from about 2% to about 50% Al, and --

Column 11,
Line 15, "80% Ru, from about 20% to about 20% Al, up to" should read -- 80% Ru, from about 2% to about 20% Al, --

Column 12,
Line 4, "80% Ru, from about 20% to about 20% Al, up to" should read -- 80% Ru, from about 2% to about 20% Al, up to --

Column 13,
Line 4, "to about 35% Cr, from about 50% to about 40% Al, and the" should read -- to about 35% Cr, from about 5% to about 40% Al, and the --

Signed and Sealed this

Twenty-first Day of December, 2004

JON W. DUDAS
*Director of the United States Patent and Trademark Office*